Aug. 11, 1970 C. W. COX ET AL 3,524,164

DETECTION AND ERROR CHECKING SYSTEM FOR BINARY DATA

Filed Jan. 15, 1968

INVENTORS
CECIL WAYNE COX
FREDERICK T. MAY

BY John W Girvin, Jr.
ATTORNEY

United States Patent Office 3,524,164
Patented Aug. 11, 1970

3,524,164

DETECTION AND ERROR CHECKING SYSTEM FOR BINARY DATA

Cecil Wayne Cox and Frederick T. May, Lexington, Ky., assignors to International Business Machines Corporation, Armonk, N.Y., a corporation of New York
Filed Jan. 15, 1968, Ser. No. 697,717
Int. Cl. H03k 13/34
U.S. Cl. 340—146.1 5 Claims

ABSTRACT OF THE DISCLOSURE

A phase encoded data recording and error checking system wherein each serially recorded data character is checked to determine that it has the proper number of data flux reversals. By checking the direction of the last data flux reversal, the proper number of corrective flux reversals is ascertained. Additionally, the presence of noise signals of the same polarity as the next subsequent data signal causes the noise signal to be correctly sensed as data while rejecting the data signal provided the noise signal is within the self-clocking tolerance and causes an error indication if the noise signal is without the self-clocking tolerance. The presence of noise signals of opposite polarity from data signals remain undetected and do not affect information content.

CROSS REFERENCES TO RELATED APPLICATIONS

The following applications are all assigned to the same assignee as the present application.

U.S. patent application Ser. No. 697,735, entitled "Data Reading, Recording, and Positioning System," Douglas E. Clancy, George W. Hobgood, Jr., and Frederick T. May, inventors, filed 1968 concurrently herewith.

U.S. patent application Ser. No. 697,716, entitled "Recording and Playback System Incorporating a First Character Positioning System," Donald J. Morrison and Howard C. Tanner, inventors, filed 1968 concurrently herewith.

U.S. patent application Ser. No. 623,053, filed Mar. 14, 1967, and now abandoned entitled "Data System With Printing, Composing, Communications and Magnetic Card Processing Facilities," Robert A. Kolpek, inventor.

U.S. patent application Ser. No. 623,022, filed Mar. 14, 1967, entitled "Correlated Recording, Reproducing, Printing, and Composing Apparatus," John E. Jones, Robert A. Kolpek and Robert A. Rahenkamp, inventors.

BRIEF BACKGROUND OF INVENTION

Field

The invention relates to self-clocked information recording and playback systems and, more particularly, to a method and means for checking the accuracy of information previously recorded.

Description of the prior art

Prior art recording devices wherein a magnetic media moves relative to a pickup head are well known. Many of these devices are self-clocking, that is, the recorded data signals are utilized to control the sensing of the next subsequent data signals. Such prior art self-clocking data recording and playback systems utilize two well known encoding techniques, phase encoding and frequency encoding. Utilizing either technique, the recorded data generates clock signals which properly time the playback of the information. Each clock signal thus derived from the data can be utilized to bracket the next subsequent clock and information signal to thereby gate out spurious noise signals which may be recorded on the information track. If the next subsequent clock signal does not occur within the bracketed time interval, either a clock signal is generated by the system to take the place of the dropped signal or, an error is indicated.

In those systems where long blocks of information are recorded, redundant parity bits are added to the information signals so that information sensed can be reconstructed without necessitating the rereading of an entire block of information.

Additionally, prior art systems are known wherein short blocks of information of fixed length generally representative of a character of information are recorded on the media. Since the total number of information signal transitions is known, a counter can be utilized to insure proper parity with such a system.

Thus, prior art systems show the utilization of parity bit checking to detect error and, additionally, the prior art shows the utilization of a previously recorded clock signal to bracket the next subsequent clock and data signal thereby gating spurious noise signals out.

While those systems which read long blocks of information and thereafter utilize redundant parity checking to reconstruct the information have proven adequate for large scale data processing facilities, they are expensive and add complex electronic circuitry. Conversely, inexpensive systems which merely check the parity of information characters recorded provide an insufficient guarantee of error free information. This is particularly true where the surface of the recording media may be handled by machine operators and thus be subjected to a noise introducing environment.

SUMMARY

In order to overcome the above problems and shortcomings of the prior art and to provide a recording wherein a high degree of accuracy is maintained, the data recording system of the present invention is provided with a unique error detection scheme wherein a gating signal is developed with each clock pulse which not only determines the time interval during which the next subsequent clock pulse must occur, but also determines two time intervals during which no significant signal is to occur and an additional time interval during which a flux reversal may occur. All non-significant signals (those which could not be confused with data) are ignored.

An additional data check is performed by counting the number of clock pulses during each character playback cycle. The information content of the last flux reversal is thereafter checked to insure proper parity.

The foregoing and other features and advantages of the invention will be apparent from the following more particular description of the preferred embodiment of the invention as illustrated in the accompanying drawings.

IN THE DRAWINGS

Figure 1:
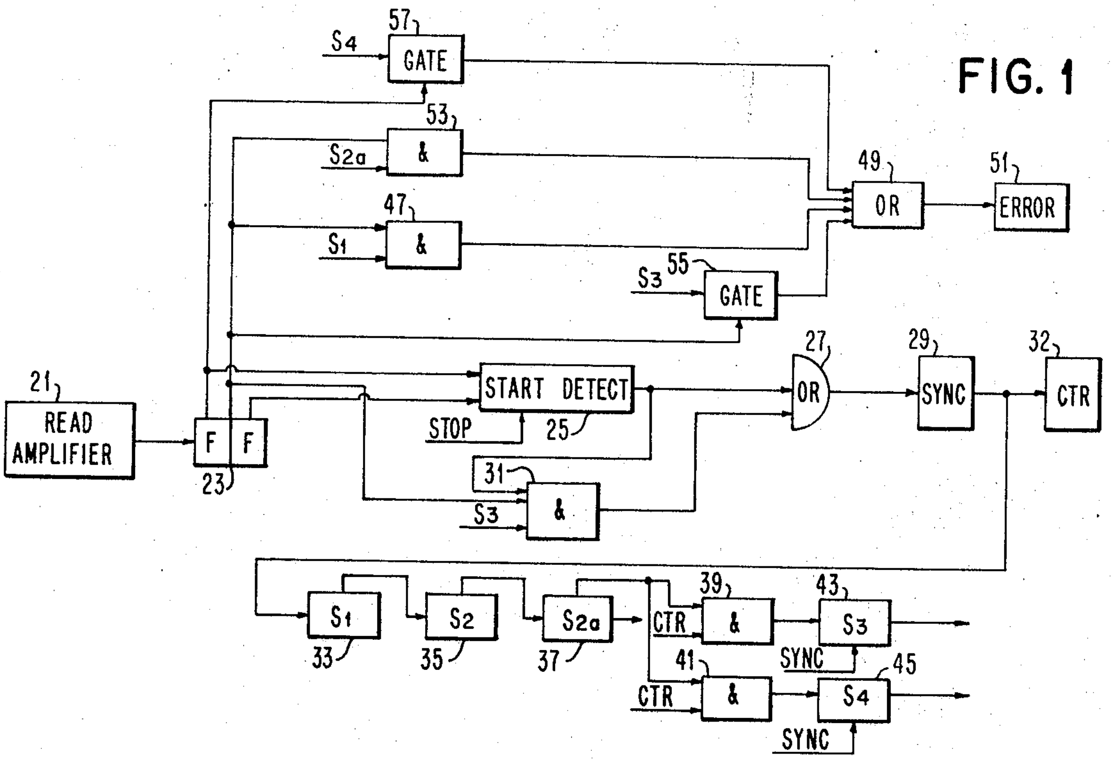
FIG. 1 is a schematic block diagram of the error detection system of the present invention.

Referring now to FIG. 1, a logic block diagram of the error detection system of the present invention is depicted. Prior to entering into a detailed description of the functions of each logic block depicted, the following description will relate generally to the error detection system utilized.

The error detection system comprises two parts: logic which recognizes legitimate information signals during certain time intervals, and which recognizes that significant signals have occurred indicating error during other time intervals; and logic which insures that the proper number of legitimate signals have occurred.

Figure 2:
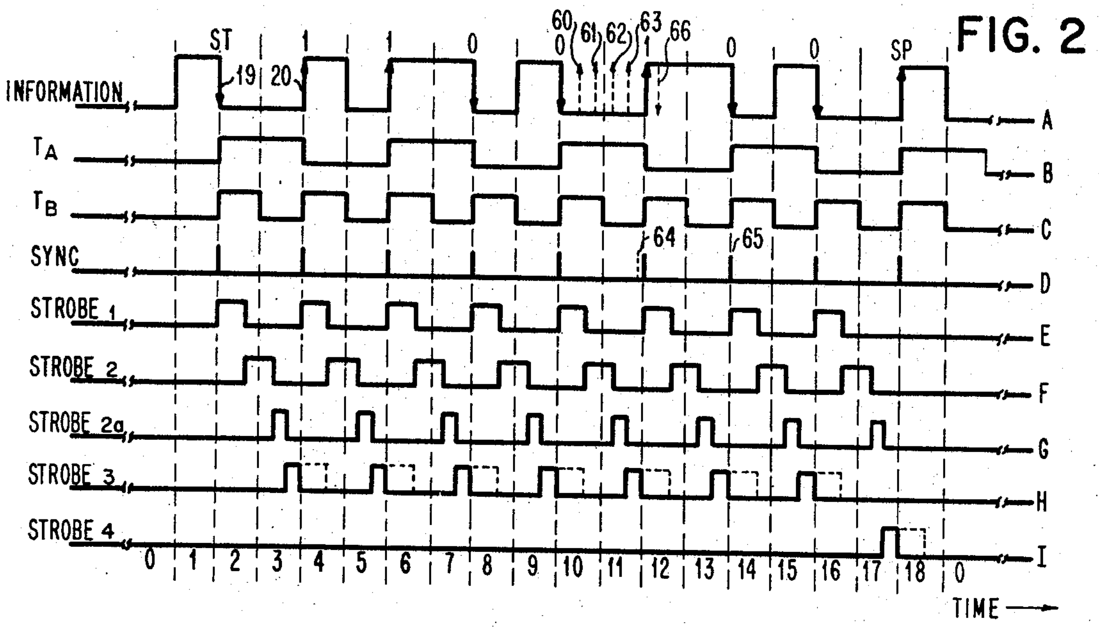
FIG. 2 is a timing diagram of the output signals of various logic blocks of FIG. 1 with respect to a typical data character.

Referring now briefly to FIG. 2 of the drawings, a signal wave form representative of a typical character of information is depicted at A. This wave form is representative of a character encoded according to the well-known phase encoded technique wherein binary information is represented by a change from one binary state to another, binary "1" information arbitrarily being defined as a positive going change while binary "0" information being arbitrarily defined as a negative going change. When recording on a magnetic media, these changes are in the form of flux changes; that is, the magnetic media is saturated first in one direction and then in another with the boundary between two such areas being detected to represent information content. Such flux reversals are sensed as significant signals.

As can be seen, those flux changes denoted by arrows, for example, 19 and 20, occur at constant time intervals thereby providing, upon proper detection, a train of clock pulses as well as a train of data pulses. These flux reversals denoted by arrows will hereinafter be referred to as data flux reversals.

When two adjacent data bits have the same binary value, it is necessary to reverse the flux at a point intermediate the two adjacent data flux reversals which represent the two adjacent bits. An example of such a flux reversal is seen between time intervals 4 and 5 and again between time intervals 8 and 9. Such flux reversals will hereinafter be referred to as corrective flux reversals.

The $T_A$ clock pulse wave form B could be utilized to record the data flux reversals by recording circuitry (not shown). It is shown merely to depict that the data flux reversals occur at a fixed frequency. Similarly, the $T_B$ clock pulse wave form C could be utilized to record the corrective flux reversals. It is shown merely to depict that the corrective flux reversals occur midway between the data flux reversals in the information wave form A that is illustrated. It is, of course, recognized by those skilled in the art that the corrective flux reversals could occur earlier or later in accordance with the constraints of the system.

Because of media slippage, velocity variations of the moving media, electronic tolerances, and peak shift variations effected by bit density, media to head separation and head frequency response, the data flux reversals and corrective flux reversals do not occur at a precise time as depicted, but rather, occur within a predetermined time interval, the length of the interval being equal to the desired worse case situation. Since it is known that a data flux reversal will occur within a predetermined time interval after the last preceding data flux reversal and also that a corrective flux reversal may occur within a predetermined time interval after the last data flux reversal, these two time intervals may be precisely located. Any significant signal sensed outside of these two time intervals indicates that noise is present and that an error condition may exist. Thus, the logic circuitry shown in FIG. 1 defines a plurality of time intervals during which a significant signal must occur, during which it may occur, and during which it must not occur.

Additionally, since each data character consists of a predetermined number of data flux reversals and since at the end of each character, the media is returned to its initial flux condition thereby indicating that an even number of flux reversals must have occurred, the direction of the last flux reversal is sensed to indicate whether the proper number of corrective flux reversals have been recorded. The logic circuitry shown in FIG. 1 also performs this function.

Referring once again to FIG. 1, the following description will relate to the detail of operation of each of the logic blocks depicted. Read amplifier 21 is provided with input signals representative of the information recorded on the media. This information is derived in a well known manner as the media passes adjacent to a magnetic playback head. Such a system is described in the aforereferenced application of Douglas E. Clancy, George W. Hobgood, Jr., and Frederick T. May, filed concurrently herewith.

The read amplifier 21 reshapes and amplifies the input signals and provides an output signal wave form similar to the information wave form of FIG. 2 described above. This output signal wave form is applied to flip-flop 23 which changes state when the signal wave form changes state to a polarity opposite from the state of the flip-flop.

Thus, the left-hand side of flip-flop 23 is set with a positive going pulse while the right-hand side of flip-flop 23 is set with a negative going pulse. Once the left-hand side of the flip-flop has been set with a positive going pulse, additional positive going pulses have no effect on the flip-flop. The right-hand side of the flip-flop operates in a similar manner so that negative going pulses have no effect on the flip-flop once the right-hand side has been set. Since each corrective flux reversal is preceded by a data flux reversal of opposite polarity and since each data flux reversal is preceded either by a data flux reversal of opposite polarity or by a corrective flux reversal of opposite polarity, each such flux reversal and corrective flux reversal will cause the read amplifier 21 to provide a significant signal to flip-flop 23 which will change state provided that no intervening noise pulse operated to change the state of flip-flop 23. Further, in order for such an intervening noise pulse to effect a change of state of flip-flop 23, it must be of the same polarity as the next subsequent data flux reversal or corrective flux reversal. Those noise pulses of opposite polarity cause no change of state of flip-flop 23 and therefore have no effect on the error detection system.

Those data flux reversals, corrective flux reversals, and noise signals which cause flip-flop 23 to change state are significant signals while noise signals which do not cause flip-flop 23 to change state are non-significant signals. The output signals of flip-flop 23 representative of significant signals are provided to the remaining logic circuits shown to determine if error exists. Flip-flop 23 provides three output signals, one indicative of a change of state of the input signal depicted as emanating from the center top of the flip-flop circuit 23, another indicating a positive going change of state depicted as emanating from the left-hand top of flip-flop 23 and the third indicating a negative going change of state depicted as emanating from the right-hand top of flip-flop 23.

As described in the afore-referenced application of Douglas E. Clancy, George W. Hobgood, Jr. and Frederick T. May, filed concurrently herewith, data characters are recorded on the media serially by bit, serially by character with an intercharacter gap. In order to detect the start of a data character, start detect circuit 25 is responsive to a positive going change of flip-flop circuit 23 followed at a predetermined time interval thereafter by a negative going change of flip-flop circuit 23 to provide an output signal. The positive transition followed by the negative transition a fixed time thereafter corresponds to a predetermined pattern which precedes the information flux reversals of each data character. The output signal of the start detect circuit remains on until the start detect circuit is reset by a stop signal. This output signal is applied to OR circuit 27 and thence to sync pulse generator 29. Sync pulse generator 29 is responsive to a change of state of its input signal to provide an output pulse of short duration. The output signal of the start detect circuit 25 is also applied to AND circuit 31. Thereafter, each change of state of flip-flop circuit 23 that occurs during a time interval within which a data flux reversal is to occur is gated by AND circuit 31 through OR circuit 27 to the sync pulse generator 29. Hence, each data flux reversal initiates an output signal from the sync pulse generator 29.

The output signal of the sync pulse generator 29 is applied to the counter 32 which counts the number of sync pulses (and hence data flux reversals) within a character. The sync pulse generator 29 also initiates a clocking sequence wherein the time intervals are defined during which a significant signal must not occur, where it may occur, and where it must occur. Thus, the output signal of the sync pulse generator 29 is applied to the $S_1$ strobe pulse generator 33. This strobe pulse generator could be a monostable multivibrator which remains in a set condition for a predetermined time interval prior to resetting to its stable state. This circuit could also be a simple clocking circuit which causes an output signal to be provided for a fixed time duration. The resetting of the $S_1$ strobe pulse generator 33 provides a signal which causes the $S_2$ strobe pulse generator 35 to become set. This circuit may be of similar construction to the $S_1$ strobe pulse generator 33. In a similar manner, the resetting of the $S_2$ strobe pulse generator circuit 35 causes the $S_{2a}$ strobe pulse generator circuit 37 to become set.

Upon resetting, the $S_{2a}$ strobe pulse generator circuit 37 provides an output signal to AND circuits 39 and 41. The AND circuit 39 is gated with an output signal from counter 32 indicating that the counter has not yet reached a count indicative that all of the data bits of a data character have been read while AND circuit 41 is supplied with an output signal from counter 32 that indicates that all of the data bits of the character have been read. Thus, in accordance wih the state of counter 32, AND circuit 39 provides an output signal which gates on the $S_3$ strobe pulse generator circuit 43 while AND circuit 41 provides an output signal which gates on the $S_4$ strobe pulse generator circuit 45. Of course, the outputs of the $S_3$ and $S_4$ strobe pulse generators are mutually exclusive.

Referring now to FIG. 2, a timing diagram showing the output signals of the sync pulse generator 29 and the strobe pulse generator circuits 33, 35, 37, 43, and 45 of FIG. 1 are depicted by wave forms D through I, respectively. Wave form A depicts a typical information pulse wave form as described above. It can readily be observed that the sync pulses of wave form D occur with each data flux reversal of the information wave form. Further, it can readily be observed that a strobe 1 pulse of wave form E occurs with the occurrence of a sync pulse, a strobe 2 pulse of wave form F occurs simultaneously with the turn off of the strobe 1 pulse, a strobe 2*a* pulse of wave form G occurs simultaneously with the turn off of the strobe 2 pulse, and a strobe 3 pulse of wave form H occurs upon the turn off of a strobe 2*a* pulse. The strobe 3 pulse is reset upon the occurrence of the next subsequent sync pulse. The dotted line of the strobe 3 pulse refers to the time period of the strobe 3 pulse should a sync pulse not appear.

Referring to the information wave form A, it can be seen that all data flux reversals occur when the strobe 3 wave form H is positive. Additionally, all corrective flux reversals occur during the positive periods of the strobe 2 wave form F. Further, it will be noted that no flux reversals occur during the positive periods of the strobe 1 and the strobe 2*a* wave forms E and G respectively.

An additional wave form I showing the output of the $S_4$ strobe pulse generator circuit of FIG. 1 is also depicted. It is to be noted that an output pulse occurs with the last reset of the strobe 2*a* wave form G. It is also noted that there is no strobe 3 wave form pulse at this time. The strobe 4 wave form occurs prior to the last data flux reversal and is reset upon the occurrence of the last data flux reversal. The dotted line shows the time duration of the strobe 4 pulse should a data flux reversal not occur. The last data flux reversal of wave form A, labelled "SP," is positive going and is followed at a time interval thereafter by a negative going reversal.

The preceding description has related to the logic circuits which define specific time intervals during the sensing of a typical information character and to the interrelationship of the various time intervals thus defined. The following description will relate to the functions of the specific logic blocks utilized to detect and indicate that an error condition exists. Generally, an error condition exists whenever a significant signal occurs within the time intervals defined by a strobe 1 or a strobe 2*a* pulse. An error condition also exists if a flux reversal does not occur within the time intervals defined by a strobe 3 pulse or a strobe 4 pulse. Further, the last data flux reversal must be positive going to insure that the proper number of corrective flux reversals have occurred.

Referring once again to FIG. 1 of the drawings, AND circuit 47 gates the output of the $S_1$ strobe pulse generator 33 with an output line of the flip-flop 23 indicating any change of state of the flip-flop. Thus, if flip-flop 23 changes state during the time interval that the $S_1$ strobe pulse generator 23 provides an output signal, AND circuit 47 provides an output signal to OR circuit 49 which in turn sets error detect latch 51. In a similar manner, AND circuit 53 gates the output signal of the $S_{2a}$ strobe pulse generator 37 with the output of flip-flop 23 to thereby set the error detect latch should the flip-flop change state during the time interval that the $S_{2a}$ strobe pulse generator provides an output.

Gate circuit 55 is set when the $S_3$ strobe pulse generator 43 provides a positive going output signal. Gate circuit 55 is degated by the output signal of flip-flop circuit 23 indicating that the flip-flop circuit 23 has changed state. If, however, flip-flop circuit 23 provides no such output signal, gate circuit 55 provides an output signal upon the resetting of the $S_3$ strobe pulse generator 43. Thus, gate circuit 55 provides an output signal if flip-flop 23 does not change state during the time interval defined by the $S_3$ pulse generator. This output signal is applied to OR circuit 49 to set the error detect latch 51. In a similar manner, gate circuit 57 gates the output signal of the $S_4$ pulse generator 45 unless a degating signal is applied on the occurrence of a signal from the left-hand side of flip-flop circuit 23. The left-hand side of flip-flop circuit 23 provides an output signal only when the right-hand side of the flip-flop circuit 23 is in its on state and when read amplifier 21 thereafter senses a positive going flux transition. Thus, gate circuit 57 insures that a positive going transition must occur during the time interval defined by the $S_4$ strobe pulse generator 45 and provides an output signal to OR circuit 49 thereby setting the error detect latch 51 if such a signal does not occur.

OPERATION

Read amplifier 21 provides an output signal representative of phase encoded data information similar in nature to wave form A of FIG. 2 to flip-flop circuit 23 as the data signals are sensed from the magnetic media which moves relative to a pickup head. Flip-flop circuit 23 changes state with each significant signal change provided by read amplifier 21. Start detect circuit 25, responsive to the output of the flip-flop circuit 23 recognizes a predetermined start pattern associated with each data character and provides an output signal indicating that a data character thereafter will follow. This signal initiates the error detection circuitry of the present invention which insures that the data character is properly recorded and sensed.

Since the time interval during which a data flux reversal must occur is defined by utilizing the self-clocking technique of a phase encoded system, and since the time interval during which a corrective flux reversal may occure is also defined, the error detection circuitry indicates error if a significant signal occurs outside of these time intervals or if a data flux reversal does not occur within the time interval during which is must occur. Thus, when start detect circuit 25 indicates that the start bit of a data character has been detected, sync pulse generator 29 provides output signal to strobe pulse generator 33. Strobe pulse generators 35, 37, 43, and 45 thereafter provide a sequence of output pulses which define the time intervals during which significant signals may occur, during which they must occur, and during which they must not occur. AND circuits 47 and 53 and gating circuits 55 and 57 are responsive to the various strobe pulse generators and to flip-flop 23 which indicates that a significant signal has occurred to indicate error through error detection latch 51 if a significant signal occurs during that time interval where it must not occur, or if a flux reversal does not occur during that time interval in which it must occur. Each data flux reversal resets the strobe pulse generators to their initial status and causes sync pulse generator 29 to provide an output signal. Thereafter, the strobe pulse generators are again operative to define the various time intervals. Hence, the time intervals defined by the strobe pulse generators are referenced to the preceding data flux reversal.

Counter 32 is responsive to the output of the sync pulse generator 29 to count the number of sync pulses. Since all data characters have the same number of data flux reversals, and since sync pulse generator 29 provides an output signal with each data flux reversal, counter 32 insures that the proper number of data flux reversals have occurred. Since the number of data flux reversals which must occur within a character is known and since the media is returned to the same magnetic state that it was in prior to reading the data character to insure the proper sensing of the next subsequent character, the occurrence of the proper number of corrective flux reversals can be readily ascertained by checking the direction of the last data flux reversal. In the present instance, each data character has an odd number of data flux reversals and since the media is returned to its initial state, there must be an even number of total flux reversals. Hence, it follows that there must be an odd number of corrective flux reversals since the number of corrective flux reversals added to the number of data flux reversals equals the total number of flux reversals. If the direction of the last data flux reversal is such so that the media will not be returned to its initial state, and if the proper number of data flux reversals have occurred as indicated by counter 32, it follows that an improper or even number of corrective flux reversals have been sensed and that the character thus sensed is in error. Gate circuit 57 is responsive to flip-flop circuit 23 to insure the proper direction of the last data flux reversal.

Referring now to FIG. 2 of the drawings, some particular error situations will be described. Dotted lines 60 through 63, occurring during time intervals 10 and 11 in wave form A, represent noise spikes which could potentially occur and which are selectively detected as an error condition by the logic circuitry depicted in FIG. 1. Noise spikes and wave forms can be introduced into the system by radiated noise, power supply instability, and discontinuities (e.g. scratches) in the media.

It will be noted that noise spike 60 occurs in the time interval defined by a strobe 1 pulse of wave form E, noise spike 61 occurs within a time interval defined by a strobe 2 pulse form of wave form F, noise spike 62 occurs within a time interval defined by a strobe 2*a* pulse of wave form G, and that noise spike 63 occurs within a time interval defined by a strobe 3 pulse of wave form H.

In the description which follows, it will be assumed that only one of the noise spikes 60–63 occurs. Thereafter, there will follow a discussion relating to potential multiple noise spikes. Each of the noise spikes 60–63 are positive going. A negative going noise spike would not be recognized since the data flux reversal occurring between time intervals 9 and 10 is negative going and since a subsequent negative going pulse has no effect on the wave form detection circuitry. Thus, during time intervals 10 and 11, only positive going noise spikes could potentially cause erroneous detection of data and therefore, only positive noise spikes set the error detection logic of FIG. 1.

Positive going noise spike 60 occurring during a strobe 1 time interval actuates the error detection logic as does positive going noise signal 62 which occurs during a strobe 2*a* time interval as described above with respect to FIG. 1. However, noise spike 61, which occurs during a strobe 2 time interval does not set the error detection circuitry since it is not known at the time of detection whether the noise spike 61 is a valid corrective flux reversal or whether it is a noise spike. However, the positive going noise spike causes the detection circuitry to thereafter recognize only negative going flux reversals. Thus, when the actual positive going data flux reversal occurring between time intervals 11 and 12 is read, it will not be recognized. Since no data flux reversal would thus result during the corresponding strobe 3 time interval occurring during portions of time intervals 11 and 12, an error would be indicated. Thus, while noise spikes 60 and 62 are immediately detected as erroneous, noise spike 61 is not immediately detected. However, it operates through the error detection circuitry to prevent the detection of the actual data flux reversal to thereby indicate error.

Noise spike 63, occuring during a time interval defined by a strobe 3 pulse is recognized as a data flux reversal. The subsequent actual data flux reversal occurring between time intervals 11 and 12 is not recognized since the detection circuitry is set by the noise spike 63 to therafter recognize only negative going flux reversals. Since the noise pulse has the same data content as the actual data flux reversal, the information thus contained in the data character wave form is not altered by detecting the noise pulse as a data pulse. Hence, no error is indicated at this time. However, recognition of the noise spike 63 as a data flux reversal could throw off the self-clocking mechanism of the system since the recognition of a data flux reversal sets up the time interval during which the next data flux reversal must occur. Thus, recognition of noise spike 63 as a data flux reversal would cause the sync signal of wave form D to occur early as indicated by the dotted line 64. This would in turn cause a corresponding shift to the left of the strobe pulses of waveforms E, F, G, and H occurring during time intervals 12, 13 and 14. If the next following data flux reversal occurring between time intervals 13 and 14 occurred late, for example due to velocity tolerance variations, it may not occur within the time interval defined by the strobe 3 pulse of wave form H occurring during a portion of time intervals 13 and 14 and therefore an error would be indicated. If, however, the data flux reversal occurring between time intervals 13 and 14 occurred during the strobe 3 pulse, no error would be indicated, the system would be relocated by the occurrence of strobe pulse 65, and the correct data would be sensed by the system.

While the above discussion has related generally to the detection of a singular noise spike which could possibly effect error, it is recognized that several noise spikes could occur between sync pulses which would cause error if not properly detected. Thus, for example, if noise spike 61 occurred and was followed by a negative going noise spike at the point in time where noise spike 63 is indicated, the negative going noise spike would be erroneously detected as data and would have an erroneous data content. This erroneous negative going noise spike would cause the sync pulse to occur as at 64 hence shifting the strobe pulses of wave forms E, F, G, and H to the left. Thus, the actual data flux reversal occurring between time intervals 11 and 12 would occur during a strobe 1 time interval thereby signifying error.

Another possible error could occur if a noise spike appeared as at 61 followed by a negative going noise spike 66. The actual data flux reversal would not be recognized and the negative going noise spike 66 would be mistakenly recognized as data since it occurs during a strobe 3 time interval. However, the next subsequent data flux reversal occurring between time intervals 13 and 14 would not be recognized since the noise spike 66 would cause the recognition circuitry to only recognize positive going flux reversals. Thus, an error woul be indicated during the strobe 3 time interval occurring during portions of time intervals 13 and 14.

As described above, the direction of the stop bit is detected as an additional error detection safeguard. If, for example, noise spikes 61 and 66 occurred at the end of a data character, for example, during time intervals 15 and 16, the stop bit would not properly be detected during the time interval defined by the strobe 4 wave form I. Additionally, should the noise spikes occur during time intervals 16 and 17, the direction of the stop bit would be detected as being improper, thereby indicating error.

In the above description, a particular data character was described as exemplified by wave form A of FIG. 2. Of course, the information content of each of the characters differs and therefore, each data character comprises a unique sequence of flux reversals. However, each data character consists of the same number of data flux reversals, the same start bit pattern, and the same stop bit pattern. As is recognized by those skilled in the art, the number of data flux reversals, the start bit pattern, and the stop bit pattern are arbitrary and could be defined in a number of ways. In fact, the unique start bit pattern merely aids in spurious noise signal rejection and prevents false starts. However, the data flux reversals themselves could be utilized for such false start rejection.

While the invention has been particularly shown and described with reference to a preferred embodiment thereof, it should be understood by those skilled in the art, that the foregoing and other changes in form and detail may be made therein without departing from the scope of the invention.

What is claimed is:

1. In an information recovery system wherein information and clock pulse signals of a serial train of signals are processed in combined form, error detection means comprising:

significant signal sensing means for sensing signals whose polarity is opposite that of a preceding signal in said serial train of signals and for providing an output signal indicative of sensing a significant signal;

first means responsive to a predetermined output signal of said sensing means and thereafter responsive to an output signal of said sensing means provided during a first time interval for terminating said first time interval and for defining a subsequent first time interval during which a significant signal is sensed as a clock pulse signal;

second means responsive to each successive clock pulse signal sensed by said sensing means for defining a second time interval during which a significant signal may be sensed;

third means responsive to each successive clock pulse signal sensed by said sensing means for defining a third time interval during which a significant signal must not be sensed;

detection means responsive to the output signal of said sensing means and to said first and third means for providing an output signal indicative of error when a significant signal occurs during said third time interval or when no significant signal occurs during said first time interval.

2. The error detection means of claim 1 wherein said third means defines a first time sub-interval occurring prior to said second time interval and a second time sub-interval following said second time interval, said first and said second sub-intervals comprising said third time interval.

3. The error detection means of claim 1 having counter means responsive to said sensing means and to said first means for counting each significant signal which occurs during each successive first time interval defined by said first means and for providing an output signal indicative of a predetermined count;

means responsive to the output signal of said counter means for inhibiting said first means, said second means, and said third means from defining said first, second, and said third time intervals.

4. The error detection means of claim 1 further comprising:

means for determining the polarity of each significant signal sensed as a clock pulse and for providing a binary output signal in accordance with said polarity;

means responsive to said binary output signal for providing an indication of the information content of said serial train of signals.

5. The error detection means of claim 3 having second detection means responsive to the counter means and to the sensing means for determining the polarity of a predetermined significant signal defined by said counter means and for providing an output signal indicative of error should the polarity differ from a predetermined polarity.

References Cited

UNITED STATES PATENTS

| | | | |
|---|---|---|---|
| 2,985,715 | 5/1961 | Campbell | 328—119 X |
| 3,054,990 | 9/1962 | Noonan | 340—174.1 |
| 3,335,224 | 8/1967 | Meslener et al. | 325—320 X |
| 3,439,327 | 4/1969 | Sourgens | 340—146.1 |

EUGENE G. BOTZ, Primary Examiner

C. E. ATKINSON, Assistant Examiner

U.S. Cl. X.R.

340—174.1